United States Patent Office 2,965,485
Patented Dec. 20, 1960

2,965,485
PHOTOGRAPHIC DESENSITISING COMPOUNDS

George Frank Duffin and John David Kendall, Ilford, England, assignors to Ilford Limited, Ilford, England, a British company No Drawing. Filed Sept. 10, 1958, Ser. No. 760,094

Claims priority, application Great Britain Sept. 25, 1957

4 Claims. (Cl. 96—101)

This invention relates to the production of direct positive emulsions.

There has already been described a method of producing a direct positive emulsion in which there is incorporated in a silver chloride emulsion, which is substantially free from silver bromide or silver iodide, a proportion of a desensitising compound and the emulsion is fogged by light or chemical means. When an emulsion so produced is thereafter exposed and developed, a positive image is directly produced.

In fact, however, suitable desensitising compounds for the aforesaid process are quite rare. Compounds selected from benzthiazole, quinoline, indolenine, benztriazole and rhodanine compounds, and their alkyl quaternary salts, having a nitro group attached to a benzene nucleus, have been prepared, as have also compounds such as 4-(m-nitrostyryl) cinnoline methyl p-toluene sulphonate and 4-(m-nitrostyryl) quinazoline methyl p-toluene sulphonate.

According to the present invention a direct positive photographic material comprises a silver chloride emulsion which has been fogged by light or by chemical means and which includes a desensitising compound of the general formula:

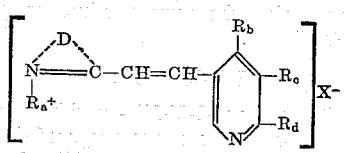

where D is the residue of a five-membered or six-membered heterocyclic nitrogen nucleus, $R_a$ is an alkyl or aralkyl group, $R_b$, $R_c$ and $R_d$ taken separately are hydrogen atoms or alkyl, aryl or aralkyl groups, or an adjacent pair thereof may together form a fused benzene ring, and X is an anion.

D may be the residue, for example, of an oxazole, thiazole, selenazole, or a polycyclic homologue thereof such as those of the benzene and naphthalene series, pyridine or a polycyclic homologue thereof such as quinoline and α- and β-naphthoquinolines, indolenine, pyrimidine, quinazoline, pyridazine, oxazoline, thiazoline or selenazoline. The polycyclic residues referred to may contain substituents on the carbocyclic rings, e.g. one or more alkyl, aryl, alkylthio, aralkylthio, amino, hydroxy, alkoxy, methylene dioxy, or nitro groups or halogen atoms.

$R_a$ is preferably a lower alkyl group, e.g. containing up to 4 carbon atoms, and may include a hydroxy substituent. $R_b$, $R_c$ and $R_d$ when not hydrogen atoms are preferably lower alkyl groups containing up to 4 carbon atoms, or either $R_b$ and $R_c$ or $R_c$ and $R_d$ may jointly constitute a benzene ring.

Compounds of especial value and which therefore constitute a narrower class of exceptional utility are those in which the right hand ring in the formula set forth is either pyridine or quinoline.

The aforesaid compounds are prepared by reacting a compound of the general formula:

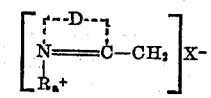

with an aldehyde of the formula:

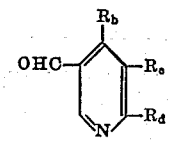

The reaction is preferably effected in an inert diluent medium and most advantageously in the presence of a base such as piperidine.

The following are examples of the production of compounds for use according to the invention:

EXAMPLE 1

*2-2'-3"-pyridylvinyl-3-ethylbenzothiazolium iodide*

Pyridine-3-aldehyde (1.07 g.), 2-methyl-3-ethylbenzothiazolium iodide (3.05 g.) and ethanol (10 ml.) were heated under reflux and piperidine (0.1 ml.) added. After boiling under reflux for twenty minutes, the mixture was cooled to precipitate the product as orange needles, M.P. 241°; the melting point was not elevated by recrystallisation from 2-methoxyethanol. (Found: C, 48.5; H, 3.8; I, 31.9. $C_{16}H_{15}N_2SI$ requires C, 48.8; H, 3.8; I, 32.2%.)

EXAMPLE 2

*1:3:3-trimethyl-2-2'-3"-pyridylvinylindoleninium iodide*

Pyridine-3-aldehyde (1.07 g.), 1:2:3:3-tetramethylindoleninium iodide (3.01 g.) and ethanol (10 ml.) were boiled and piperidine (0.1 ml.) added. After boiling under reflux for twenty minutes the solution was cooled to precipitate the product as orange plates, M.P. 219°.

EXAMPLE 3

1-ethyl-2-2'-3"-pyridylvinylquinolinium iodide was prepared from quinaldine ethiodide and pyridine-3-aldehyde by the method of Example 1, and obtained from ethanol as orange needles, M.P. 233° (d).

EXAMPLE 4

1-ethyl-4-2'-3"-pyridylvinylquinolinium iodide was prepared from lepidine ethiodide and pyridine-3-aldehyde by the method of Example 1, and obtained from ethanol as yellow microcrystals, M.P. 217° (d).

EXAMPLE 5

3-methyl-2-2'-3"-pyridylvinylbenzothiazole iodide was prepared from 2-methylbenzothiazole methiodide and pyridine-3-aldehyde by the method of Example 1, and obtained by boiling out with ethanol as pale yellow microcrystals, M.P. 212° (d).

EXAMPLE 6

1-methyl-3-methylthio-6-2'-3"-pyridylvinylpyridazinium iodide was obtain from 1:6-dimethyl-3-methylthiopyridazinium iodide and pyridine-3-aldehyde by the method of Example 1, and obtained by boiling out with ethanol as orange microcrystals, M.P. 230° (d).

EXAMPLE 7

1-methyl-2-2'-3"-pyridylvinylpyridinium iodide was prepared from α-picoline methiodide and pyridine-3-aldehyde by the method of Example 1, and obtained from ethanol as pale yellow needles, M.P. 191°.

EXAMPLE 8

1 - ethyl - 2-2'-3"-pyridylvinylpyridazinium iodide was prepared from α-picoline ethiodide and pyridine-3-aldehyde by the method of Example 1, and obtained from ethanol as pale yellow needles, M.P. 189°.

EXAMPLE 9

1:4-dimethyl-2-2'-3"-pyridylvinylthiazolium iodide was prepared from 2:3:4-trimethylthiazolium iodide and pyridine-3-aldehyde by the method of Example 1, and obtained by boiling out with ethanol as pale yellow microcrystals, M.P. 181°.

EXAMPLE 10

1-methyl-2-2'-3"-pyridylvinylquinolinium iodide was prepared from quinaldine methiodide and pyridine-3-aldehyde by the method of Example 1, and obtained from ethanol as yellow green rhombs, M.P. 192°.

EXAMPLE 11

*3 - ethyl - 2-2'-3"-pyridylvinylbenzothiazolium toluene-p-sulphonate*

2-methylbenzothiazole (14.9 g.) and ethyl toluene-p-sulphonate (20 g.) were fused together at 140° for three hours. Pyridine-3-aldehyde (10.8 ml.), ethanol (60 ml.) and piperidine (1.2 ml.) were added and the mixture boiled under reflux for 15 minutes to give a mass of orange crystals. The mixture was cooled and the solid filtered off and washed well with ethanol and the acetone. Recrystallisation from water gave the pure product as yellow needles, M.P. 207–210°.

EXAMPLE 12

*3 - methyl - 2-2'-3"-pyridylvinylbenzothiazolium toluene-p-sulphonate*

2-methylbenzothiazole (3.0 g.) and methyl toluene-p-sulphonate (3.7 g.) were fused at 140° for one hour. Pyridine-3-aldehyde (2.16 ml.), ethanol (6.0 ml.) and piperidine (0.2 ml.) were added and the mixture boiled under reflux for 15 minutes. On cooling, a yellow solid was precipitated which was filtered and washed well with hot acetone to give the pure product as pale yellow needles, M.P. 198–201°.

EXAMPLE 13

3-methyl-2-2'-3" - pyridylvinylbenzothiazolium methosulphate was prepared in the manner similar to that in Example 12 but using dimethyl sulphate (1.9 ml.) for 1 hour at 100° to effect the quaternisation. The product was obtained as yellow leaflets, M.P. 188–191°.

EXAMPLE 14

*3 - methyl - 2-2'-3"-pyridylvinylbenzothiazolium chloride*

The product of Example 12 (1.0 g.) was dissolved in water (10 ml.) and 10% sodium chloride solution (10 ml.) added. On standing, a yellow precipitate was formed and, after one hour, was filtered off and washed with acetone to give the product as yellow needles, M.P. 165°.

EXAMPLE 15

3 - methyl - 2-2'-3"-pyridylvinylbenzothiazolium bromide was obtained by a similar process to that of Example 14 and obtained as yellow needles, M.P. 219–21°.

EXAMPLE 16

3 - ethyl - 5-methyl-2-2'-3"-pyridylvinylbenzothiazolium toluene-p-sulphonate was prepared from 2:5-dimethylbenzothiazole and pyridine-3-aldehyde by the method of Example 11 and purified by boiling out with acetone to give the pure product as small yellow needles, M.P. 216–8°.

EXAMPLE 17

3 - ethyl - 5:6-dimethoxy-2-2'-3" - pyridylvinylbenzothiazolium toluene-p-sulphonate was prepared from 5:6-dimethoxy-2-methylzenzothiazole and pyridine - 3 - aldehyde by a method similar to that of Example 11 and purified by boiling out with acetone to give the product as orange yellow leaflets, M.P. 240°.

EXAMPLE 18

3 - ethyl - 5 - methyl-2-2'-3"-pyridylvinylbenzoselenazolium toluene-p-sulphonate was prepared from 2:5-dimethylbenzoselenazole and pyridine - 3-aldehyde by a method similar to that of Example 11 and purified by boiling out with acetone to give the product as yellow microcrystals, M.P. 210–11°.

EXAMPLE 19

3 - ethyl - 2-2'-3"-pyridylvinylbenzoxazolium toluene-p-sulphonate was prepared from 2-methylbenzoxazole and pyridine-3-aldehyde by a method similar to that of Example 11 and recrystallised from aqueous ethanol to give the pure product as colourless leaflets, M.P. 131°.

EXAMPLE 20

5 - chloro - 3-ethyl-2-2'-3"-pyridylvinylbenzothiazolium toluene-p-sulphonate was prepared from 5 - chloro-2-methylbenzothiazole and pyridine-3-aldehyde by a method similar to that of Example 11 and purified by boiling out with acetone to give the product as yellow leaflets, M.P. 228–31°.

EXAMPLE 21

*3 - ethyl - 2-2'-3"-quinolylvinylbenzothiazolium toluene-p-sulphonate*

Quinoline-3-aldehyde (J. Chem. Soc., 1951, 147) (0.7 g.), 2 - methylbenzothiazole ethotoluene-p-sulphonate (1.4 g.), ethanol (5 ml.) and piperidine (0.1 ml.) were boiled under reflux for 20 minutes. At the end of the time the solution was deep purple and solid was present. The mixture was cooled and the solid filtered off and washed well with acetone until the washings were no longer purple. The remaining solid was then crystallised from water to give the pure product as pale yellow needles, M.P. 254–6°.

EXAMPLE 22

3-ethyl - 6 - methoxy-2-2'-3" - pyridylvinylbenzothiazolium toluene-p-sulphonate was prepared from 6-methoxy - 2 - methylbenzothiazole and pyridine-3-aldehyde by a method similar to that of Example 11 and purified by solution in chloroform and precipitation with ether to give the pure product as yellow needles, M.P. 207–210°.

EXAMPLE 23

6 - chloro - 3-ethyl-2-2'-3"-pyridylvinylbenzothiazolium toluene-p-sulphonate was prepared from 6 - chloro-2-methylbenzothiazole and pyridine-3-aldehyde by a method similar to that of Example 11 and purified by boiling out with chloroform to give the pure product as yellow leaflets, M.P. 225–8°.

The products obtained, as already stated, are photographic desensitisers, and this is in itself surprising since generally speaking compounds containing a methine bridge linking two nitrogen atoms in heterocyclic nuclei are found to be sensitisers for photographic silver halide emulsions when the number of methine groups is uneven and desensitisers when the number is even. In the present compounds the number is uneven, but the compounds are nevertheless strong desensitisers.

In the production of direct positive emulsions according to the invention, the selected compound of the type defined is included in the silver chloride emulsion in an amount which is preferably from 0.1 to 2 gm. of the compound per 100 gms. of silver chloride. The emulsion may be pre-fogged by exposure to light, but it is preferred to pre-fog the emulsion chemically, for example by including formaldehyde in the emulsion and allowing the emulsion to stand at elevated temperature. It is generally advantageous to include an optical bleaching agent, known per se, in the emulsion or in the support on which the emulsion is coated.

The following example will serve to illustrate the production of direct positive emulsions according to the invention:

EXAMPLE 24

4.4 litres of a washed photographic emulsion containing 188 g. silver chloride and adjusted to a pH of 10 were treated with 12 ml. of a 4% solution of formaldehyde. After heating for 35 minutes at 125° F., the emulsion was neutralised by addition of citric acid and cooled. There was then added 2 g. of 2-2'-3'''-pyridylvinyl-3-ethylbenzothiazolium iodide dissolved in 100 ml. of formamide and 120 ml. of a 5% aqueous solution of Tinopal 2BP (a commercial optical bleaching agent). The emulsion was coated on paper.

On exposure and development the coated paper yielded a direct positive image of high quality.

Similar results were obtained using, instead of the stated compound, similar quantities of other compounds of the series and of other quaternary salts such as the alkyl halides, alkyl sulphates, sulphonates and the like.

The desensitising compounds characteristic of this invention have the important advantage of yielding images substantially free from colour stain. This is particularly the case when the emulsions contain optical bleaching agents of anionic character since the laking with cationic desensitisers as hitherto employed is avoided.

What we claim is:

1. A direct positive photographic element comprising a gelatino silver halide emulsion of which the silver halide consists essentially of silver chloride and which is fogged so that on photographic development it is uniformly rendered a solid black, said emulsion containing a desensitising compound of the general formula:

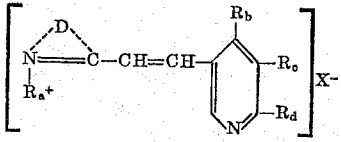

where D represents the non-metallic atoms necessary to complete a heterocyclic nucleus selected from the class consisting of the oxazole series, thiazole series, selenazole series and the series of benzene and naphthalene homologues thereof, pyridine series, quinoline series, $\alpha$ and $\beta$-naphthoquinoline series, indolenine series, pyrimidine series, pyridazine series, oxazoline series, thiazoline series and selenazoline, $R_a$ is selected from the class consisting of alkyl and aralkyl groups, $R_b$, $R_c$ and $R_d$ taken separately are each selected from the class consisting of the hydrogen atom, alkyl, aryl and aralkyl groups and $R_c$ and $R_d$ taken together represent the carbon atoms necessary to complete a quinoline nucleus, and X is an anion.

2. A direct positive photographic element according to claim 1 wherein the emulsion is fogged by treatment with formaldehyde.

3. A direct positive photographic element according to claim 1 wherein the emulsion is fogged by light.

4. A direct positive photographic element according to claim 1 wherein the proportion of said desensitising compound is 0.1 to 2 g. per 100 g. of silver chloride present.

References Cited in the file of this patent

UNITED STATES PATENTS

| | | |
|---|---|---|
| 2,265,907 | Kendall | Dec. 9, 1941 |
| 2,541,472 | Kendall et al. | Feb. 13, 1951 |